United States Patent [19]

Zimmermann et al.

[11] 4,161,008
[45] Jul. 10, 1979

[54] PROTECTION CIRCUITRY FOR CABLE TRANSMISSION SYSTEM

[75] Inventors: Detlef Zimmermann; Sayman F. Demircioglu; Jindrich Kugler, all of Ottawa, Canada

[73] Assignee: Northern Telecom Limited, Montreal, Canada

[21] Appl. No.: 900,264

[22] Filed: Apr. 26, 1978

[51] Int. Cl.$^2$ .............................................. H02H 9/04
[52] U.S. Cl. ............................... 361/56; 179/170 R; 330/207 P; 361/91; 361/119
[58] Field of Search ............ 361/56, 90, 91, 111, 361/112, 119; 179/170 R, 170 J, 170 T; 330/207 P

[56] References Cited

U.S. PATENT DOCUMENTS

| | | | |
|---|---|---|---|
| 3,644,787 | 2/1972 | Hamilton | 179/170 J X |
| 3,894,274 | 7/1975 | Rosenberry, Jr. | 361/56 X |
| 4,099,217 | 7/1978 | Fitchew | 361/56 |

FOREIGN PATENT DOCUMENTS

| | | | |
|---|---|---|---|
| 1487401 | 2/1969 | Fed. Rep. of Germany | 179/170 T |
| 2508283 | 9/1976 | Fed. Rep. of Germany | 361/56 |

OTHER PUBLICATIONS

"CS-36 M Submarine Coaxial Cable Repeater," Kaizu et al.-Review of the Electrical Communications Laboratories, vol. 22, No. 5-6, pp. 398-422, May-Jun. 1974.

*Primary Examiner*—Harry E. Moose, Jr.
*Attorney, Agent, or Firm*—John E. Mowle

[57] ABSTRACT

A protection circuit for a cable transmission system comprising a multipaired cable core surrounded by a conductive sheath wherein at least some of the cable pairs have one or more line powered repeater amplifiers connected in series therewith at discrete locations. Gas tubes connect each of the amplifiers input and output terminals to a common bus at each location. In addition a further gas tube having a breakdown voltage several times higher than the others at that location, is connected between the common bus and the conductive sheath, so as to provide controlled breakdown therebetween.

10 Claims, 3 Drawing Figures

PROTECTION CIRCUITRY FOR CABLE TRANSMISSION SYSTEM

This invention relates to protection circuitry for a cable transmission system and more particularly to an improved system utilizing negative impedance switching devices such as gas tubes for protecting line powered repeater amplifiers in such a system.

BACKGROUND OF THE INVENTION

Cable transmission systems are widely used to transmit carrier signals in the communications field. Typically, such a system utilizes a multipaired cable having repeater amplifiers spaced at periodic intervals along the system. These amplifiers are often line powered amplifiers wherein a constant current, which is fed longitudinally down one cable pair and back along another from a main terminal, is used to power the repeater amplifiers connected thereto. Each of the amplifiers must be protected from hazardous voltages which originate from three primary sources. (1) Lightning strikes—generally caused when a bolt of lightning elevates the local ground potential which in turn causes a large potential gradient between the grounded cable sheath and the cable core resulting in arc-over to one or more cable pairs thereby causing high voltages to strike one or more of the amplifiers. (2) Induced power line surges—generally result when the telephone transmission cables and the power line cables are carried on parallel (e.g. the same) poles. These surges may be continuous where there is an imbalance on the power transmission system, or momentary when a break, arc-over or short occurs in the power system. (3) Power line conduction—generally results when a break in the power cable causes a conductor to fall across the telephone cable causing direct conduction through the cable sheath to ground. This in turn elevates the potential of a localized area of the cable sheath relative to its core.

Various protection schemes have been used in the past, generally involving the use of negative impedance switching devices such as carbon protector blocks or gas tubes which have been connected in a variety of configurations across the repeater amplifier terminals. These devices present a very high impedance to the circuit until their breakdown voltage is reached whereupon they present a relatively low impedance until the hazardous voltage is removed. With the introduction of data communication systems utilizing higher carrier frequencies than the earlier analog systems, gas tubes are generally preferred to carbon blocks as they do not suffer from dust and moisture which can cause leakage and noise problems. However, despite the use of gas tubes, problems protecting the system have remained. It has been found that one reason for this is that the requirements for protecting the repeater amplifiers against lightning strikes are somewhat different from those required to protect them against power line surges.

In the past, negative impedance switching devices have been connected across both the input and the output terminals of the repeater amplifiers as well as between both their input and output terminals. At least one such device is also connected between the terminals of each amplifier and a common bus at each of the repeater sites. In some applications, these buses have been allowed to float thereby protecting the circuitry against relatively low voltage power line surges. However, this arrangement does not provide satisfactory protection against lightning strikes where exceedingly high voltages are introduced between the grounded cable sheath and the cable core resulting in uncontrolled arc-over within the system. In still other applications the common bus has been grounded. With this arrangement, the uncontrolled breakdown is minimized. However, the surge currents are now coupled through specific components, often resulting in their destruction.

STATEMENT OF THE INVENTION

It has been found that if the common bus at each station is neither connected directly to ground nor allowed to float but is connected to the grounded cable sheath via a negative impedance switching device having a voltage breakdown higher than that of the devices connected directly to the terminals and generally greater than the voltages introduced by power line surges but less than those introduced by lightning strikes, a significant reduction in the number of failures encountered in the system can be realized.

Thus, in accordance with the present invention there is provided a cable transmission system comprising a multipaired cable which includes a core having a plurality of cable pairs and a conductive sheath surrounding the core. In addition, a plurality of line powered amplifiers are located at discrete locations along the system, each connected in series with an individual cable pair via a pair of input and output terminals. The system includes a plurality of negative impedance switching devices connecting each of the terminals to a common bus. The system also includes a further negative impedance switching device connected between the common bus and the conductive sheath, which has a switching voltage greater than that of the devices connected to the terminals.

BRIEF DESCRIPTION OF THE DRAWINGS

Example embodiments of the invention will now be described with reference to the accompanying drawings in which.

DESCRIPTION OF THE PREFERRED EMBODIMENTS

Figure 1:
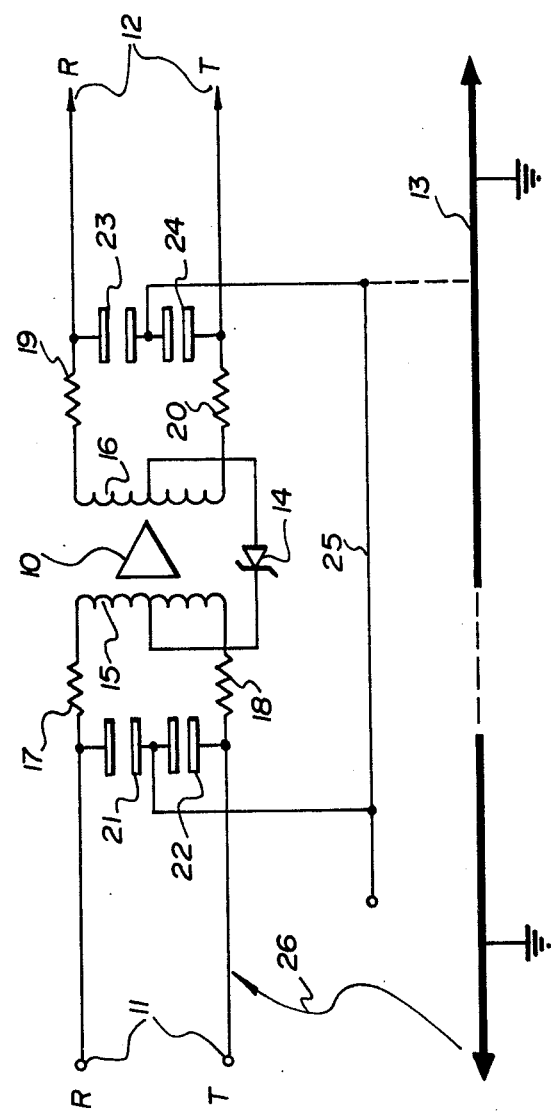
FIG. 1 is a schematic circuit diagram of an intermediate repeater in a cable transmission system utilizing protection circuitry as known in the art.

Referring to the prior art schematic circuit diagram illustrated in FIG. 1 there is shown a typical intermediate repeater in a cable transmission system which includes a typical repeater amplifier 10 connected in series with the input tip (T) and ring (R) terminals 11 and output tip (T) and ring (R) terminals 12 of a cable pair, forming part of the core of a multi-paired cable surrounded by a conductive sheath 13 which is grounded at periodic intervals along the cable.

Power for the amplifier 10 is obtained from across a zener diode 14 which is supplied from a constant current source fed serially to both T and R of the cable pair from an end or main terminal (not shown) in a well known manner. The zener diode 14 is connected between the center taps of input and output transformer windings 15 and 16 respectively. Small voltage dropping resistors 17, 18, 19, and 20 (generally in the order of 5.6 ohms) are connected in series with each lead of the cable pairs 11 and 12. Two pairs of carbon blocks 21, 22 and 23, 24 are connected in series across the input and output terminals 11 and 12 respectively. The center points of these carbon protector blocks 21–24 are connected to a common bus 25. The resistors 17–20 are required in order that sufficient voltage drop can develop across the protector blocks 21–24 to fire them. In a typical system, a number of such amplifiers (not shown), which are connected to different cable pairs in the multi-paired cable, will be located at the intermediate repeater. Each of the amplifiers will have their own carbon protector blocks connected in the same configuration to the bus 25. In some prior art applications, this bus 25 has been left floating while in other applications it has been grounded to the cable sheath 13 as indicated by the dotted line. However, both of these configurations have not proved satisfactory as will now be explained.

Assume initially that the bus 25 is left floating. If an inductive or conductive power surge occurs, portions of the cable sheath 13 will be elevated above ground (even though it is grounded periodically) due to the inherent impedance of the cable sheath 13 itself. However, except under the most extreme circumstances, such a surge will not cause the sheath voltage to rise above about 2,000 volts relative to the cable core. Since the normal breakdown voltage between the core (i.e. the cable pairs 11–12) and the sheath is in the order of 30,000 volts or greater, no breakdown will occur between the bus 25 or the cable pairs 11 and 12 and the sheath 13. However, assume now that lightning strikes the cable sheath 13 or the ground immediately surrounding it. The ground potential can be momentarily elevated anywhere from a few kilovolts to 100 kV or higher. Generally the median voltage will be in the 10–20 kV range. This exceeds the breakdown voltage of the cable and causes pinholing or arcing-over between the conductive sheath 13 and one or more of the cable pairs. This causes uncontrolled breakdown to ground in the apparatus case of the repeaters if their dielectric properties are not sufficient. This uncontrolled breakdown eventually deteriorates if not destroys a portion of the system so that future lightning strikes can cause major system failures.

Assume now that the bus 25 is grounded to the cable sheath 13. When either a conductive power surge or lightning strikes the cable sheath 13, a potential gradient commences to build between the sheath 13 and the cable pairs 11 and 12. In a practical system, the breakdown voltage of the devices 21–24 cannot be made exactly the same. Assume therefore that carbon block 22 arcs-over before the others, 21, 23, 24, have reached their breakdown potential. As a consequence, the impedance of block 22 is sharply reduced thereby causing a high current to flow from the sheath 13 through the bus 25, the block 22 and a plurality of paths back to ground. The sharply reduced voltage across protector block 22 now prevents protector blocks 21, 23 and 24 from firing. However, due to the resistance along the cable pairs 11 and 12, the potential gradient on R of lead 11 and T-R of lead 12 continues to rise until the carbon protector blocks fire at the two remote terminals in either direction (not shown). As a result, there are now four paths to ground (through 11R, 11T and 12R and 12T) for current flowing through block 22. The ground currents flowing through resistors 17, 19 and 20 are conducted through windings 15, 16 and diode 14 to resistor 18 resulting in three times the current through this resistor relative to resistors 17, 19 and 20. This heavy surge of current through the resistor 18 generally causes it to fail. A slightly different action takes place when an inductive rather than a conductive power surge is impressed on the cable, often resulting however in a similar failure of one or more of the resisotrs 17, 18, 19 or 20.

The substitution of gas tubes for the protector blocks as well as the addition of gas tubes across the amplifier does little by itself to improve the system protection, the result of which is that neither grounding nor floating the bus 25 has provided satisfactory protection for the various types of hazardous voltages introduced in the system.

Figure 2:
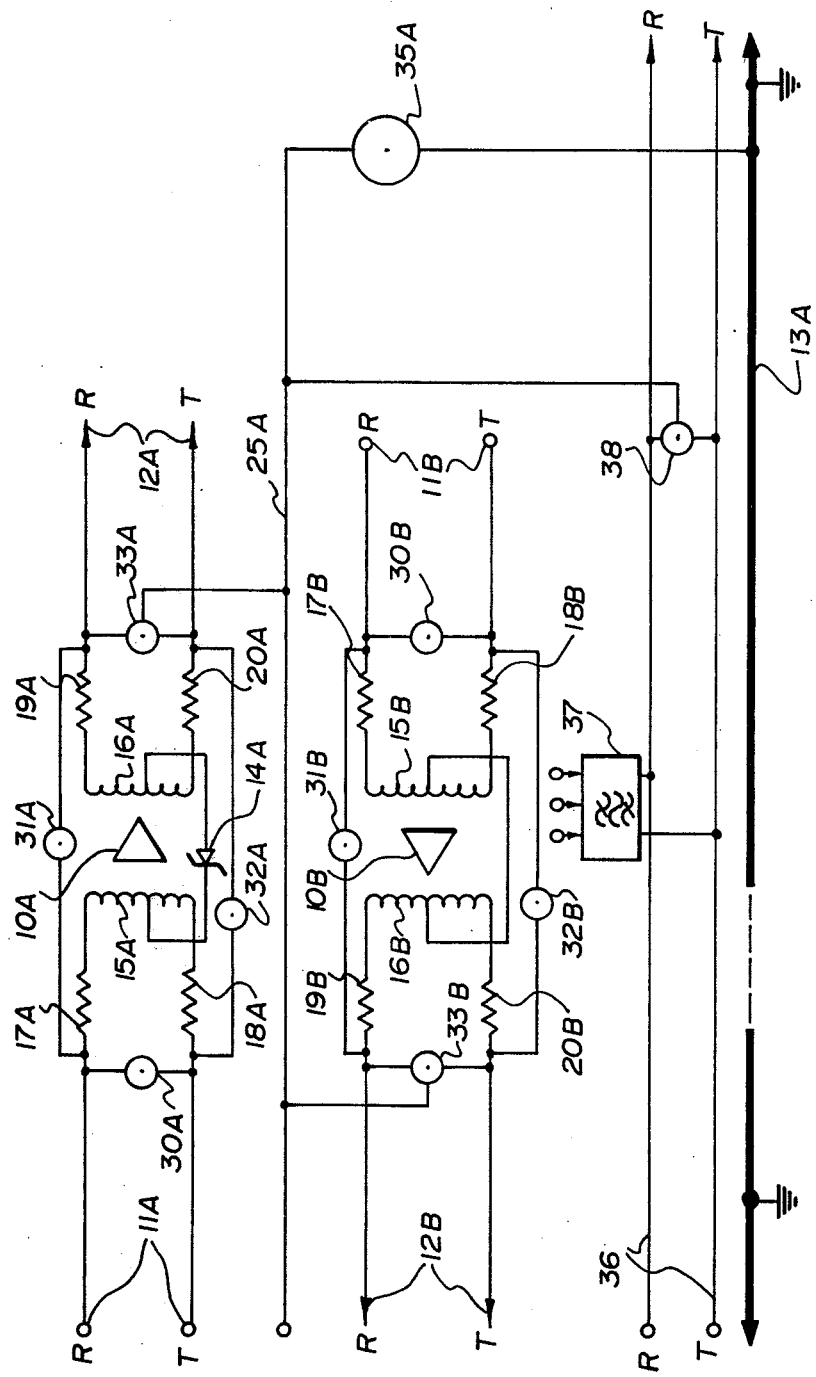
FIG. 2 is a schematic circuit diagram of a pair of intermediate repeaters in a cable transmission system utilizing protection circuitry in accordance with the present invention.
Figure 3:
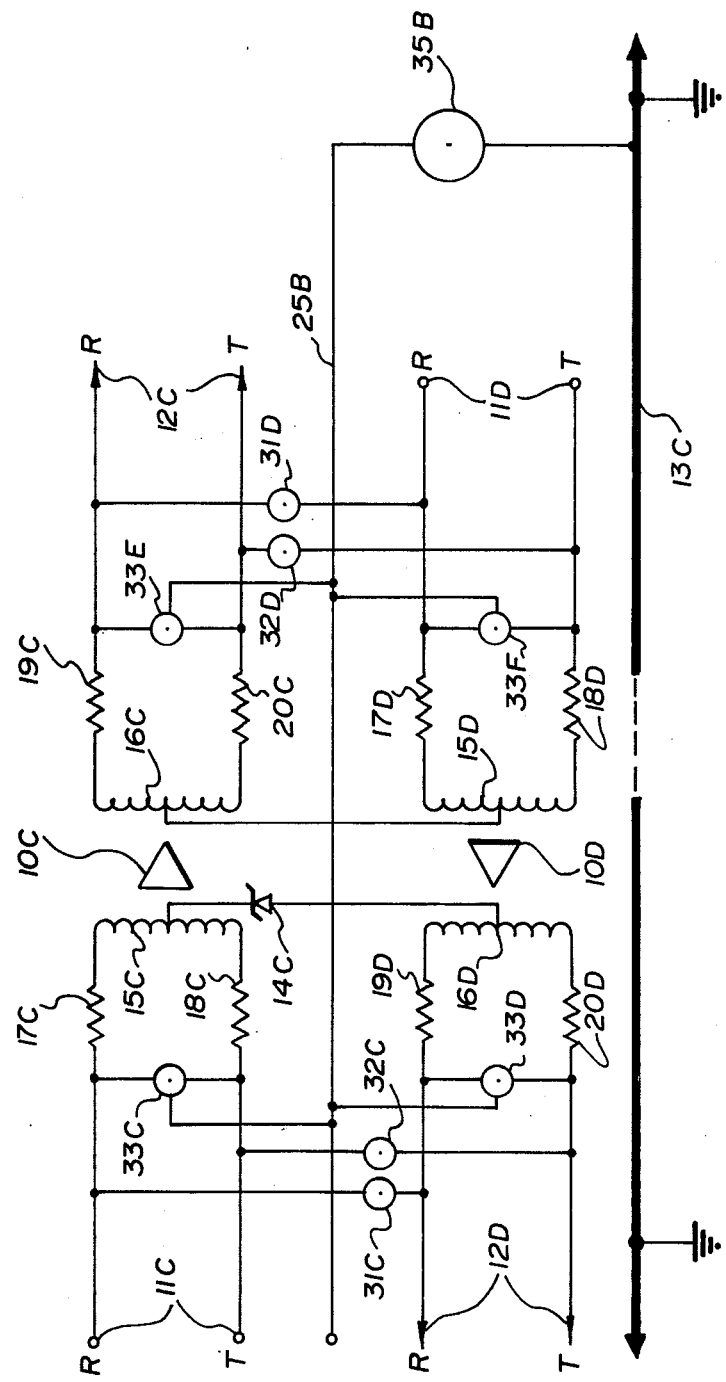
FIG. 3 is a schematic circuit diagram of a pair of power looping repeaters in a cable transmission system also utilizing protection circuitry of the present invention

In the embodiments illustrated in FIGS. 2 and 3 of the invention many of the components are identical to and perform the same function as those illustrated in the prior art of FIG. 1. These components have the same base reference numeral with an additional reference character being added to distinguish them from each other. In the following detailed description, only the reference numeral will be referred to where it is unnecessary to distinguish between the various elements.

Referring again to FIG. 2, there is illustrated two repeater amplifiers 10 connected in opposite directions in the cable at an intermediate repeater station. In a practical embodiment however, many more such repeater amplifiers would be utilized at the same location. Power which is being fed serially along the cable pairs 11A, 12A, for both amplifiers 10A, 10B, is obtained from across a single zener diode 14A. As a result, the mid-points of transformer windings 15B and 16B are connected directly to each other to conduct power back along the associated cable pair in a well known manner. To provide improved protection, four gas tubes are utilized with each amplifier 10. These include three two-element 90 volt gas tubes 30, 31 and 32 connected T or R, R to R and T to T respectively. In addition, a three-element 350 volt gas tube 33 is connected between the output T and R with its common electrode being connected to the common bus 25A. Full protection can be obtained utilizing only two of the three two-element gas tubes 30, 31 and 32 since each of the input and output terminals will still be connected through one or more gas tubes to the common bus 25A. However, utilizing the additional gas tube provides a measure of redundancy and hence added protection. Alternately, two separate two-element tubes can be substituted for the three-element tube 33. Generally one is a 90 volt tube connected between T and R, while the other is a 350 volt tube connected from either T or R to the common bus 25A.

In addition to the gas tubes 30, 31, 32 and 33, a single two-element 3 kV gas tube is connected between the common bus 25A and the sheath 13A. This additional protective element provides a marked decrease in the number of failures resulting from lightning surges striking the system. This can be better illustrated from the following examples.

Assume a voltage surge strikes the cable sheath 13A at a point remote from the repeater. A voltage gradient will commence to build up between the wires and sheath 13A primarily across the gas tube 35A. If the voltage gradient remains below about 3 kV, the tube 35A will not fire. However, no damage results to the repeater circuitry as it is capable of withstanding such gradients. However, should the gradient exceed 3 kV, the tube 35A will then fire resulting in a low impedance between the bus 25A and the sheath 13A. Since the breakdown point of the gas tube 35A is at least several times that of the rest of the gas tubes, once it fires the high voltage is immediately impressed across all of the low voltage gas tubes 30, 31, 32, 33 causing many of them to fire as well. As a result, there is controlled breakdown between the cable sheath 13, the common bus 25 and the core of cable pairs.

Thus, a particular advantage of utilizing the gas tube 35A between the bus 25 and the sheath 13 is that it causes a number of the low voltage gas tubes to fire once it is fired thereby distributing the current throughout the cable core. Alternately, unlike the prior art where the bus 25A floated relative to the sheath 13A, the use of the gas tube 35A provides a controlled breakdown so that excessively high potential differences such as caused by lightning strikes cannot exist resulting in uncontrolled breakdown across various elements of the repeater.

In applications involving the transmission of digital signals additional circuitry is utilized to test the performance of the amplifiers 10A, 10B. To achieve this, a single pair of wires known as the fault locate pair 36 is dedicated to this function. At each repeater station, a single filter 37 having a unique band-pass characteristic is lightly coupled to the output transformers 16 of each of the amplifiers 10 in a well known manner. Utilization of this fault locate filter 37 was not a problem in the prior art where the bus 25A was grounded to the cable sheath. However, in prior art applications where the bus 25A was permitted to float relative to the sheath 13, high voltage build-up on a single cable pair 36 would be coupled through the common fault locate filter 37 to each of the amplifiers at that location thereby causing multiple failures of the amplifiers 10 themselves. Since the bus 25A is not connected directly to the sheat 13A, this condition is avoided by utilizing a single three-element 350 volt gas tube 38 connected across T and R of the fault locate pair 36 with its common element connected to the bus 25A. This limits the voltage potential between the fault locate pair 36 and the balance of the components at the repeater station to a safe value.

FIG. 3 is a power looping repeater rather than an intermediate repeater where power is fed from each end of the system towards a central point. The majority of the circuit elements are identical to those shown in FIG. 2 and have therefore been assigned the same basic numerals. The major difference is that protection now is placed between the input and output paths of the power feed, i.e. cable pairs 11C to 11D and 12C to 12D. The basic function of these elements if the same as that described with respect to FIG. 2.

All two-element gas tubes have a 90 volt breakdown while the three-element tubes are of the 350 volt type. This higher voltage is necessary since the standard power fed to the system at the main terminals is ±130 volts which can result in a 260 volt potential occuring near the power feed points or should an open circuit develop somewhere in the power feed. Without these higher breakdown 350 volt gas tubes, this could result in their firing causing current to flow between cable pairs. While two separate 350 volt gas tubes can be substituted for three-element tubes 33, the latter are preferred since once breakdown of one half occurs, the ionized gas within the tube lowers the firing point of the other gas tube thereby increasing its chances of firing as well.

What is claimed is:

1. In a cable transmission system comprising:
   a multipaired cable which includes a core having a plurality of cable pairs, and a conductive sheath surrounding said core;
   a plurality of line powered amplifiers at discrete locations along the system, each connected in series with an individual cable pair through a pair of input and output terminals;
   a plurality of negative impedance switching devices connecting each of said terminals to a common bus;
   characterized by a further negative impedance switching device having a switching voltage greater than that of said plurality of devices, connected between the common bus and the conductive sheath.

2. A cable transmission system as defined in claim 1 in which the negative impedance switching devices are gas tubes and in which the gas tubes connected between the cable pairs and the common bus have a breakdown voltage at least as great as those connected between the terminals.

3. A cable transmission system as defined in claim 1 in which the negative impedance switching devices are gas tubes and in which the gas tube connected to the conductive sheath has a breakdown voltage at least several times that of the gas tubes connected to the terminals.

4. A cable transmission system as defined in claim 3 which includes a separate resistor connected in series between each terminal and its associated amplifier.

5. In a cable transmission system comprising:
   a multipaired cable which includes a core having a plurality of cable pairs and a conductive sheath surrounding said core;
   a plurality of line powered amplifiers at discrete locations along the system, each connected in series with an individual cable pair through a pair of input and output teminals;
   means connected between one pair of input and one pair of output terminals for deriving power supplied to the cable pairs connected thereto, for powering the amplifiers associated therewith;
   a plurality of negative impedance switching devices connecting each of said one pair of input and said one pair of output terminals to a common bus;
   characterized by a further negative impedance switching device having a switching voltage greater than that of said plurality of devices, connected between the common bus and the conductive sheath.

6. A cable transmission system as defined in claim 5 in which the means for deriving power from the lines is connected to the pair of input terminals of one amplifier and output terminals of another amplifier, the amplifiers being connected in opposite directions in the cable.

7. A cable transmission system as defined in claim 5 in which the means for deriving power from the lines is connected to the pair of input and output terminals of the same amplifier.

8. A cable transmission system as defined in claim 5 in which each of the negative impedance switching devices are gas tubes and in which gas tubes are also connected directly between the input and output terminals which are across the means for deriving power for powering the amplifiers.

9. A cable transmission system as defined in claim 5 in which the negative impedance switching devices are gas tubes and in which each gas tube connected between the common bus and the conductive sheath has a breakdown voltage at least several times that of the gas tubes connected to the terminals.

10. A cable transmission system as defined in claim 9 which includes a separate resistor connected in series between each terminal and its associated amplifier.

* * * * *